(12) United States Patent
Nadler (10) Patent No.: US 10,154,247 B2
(45) Date of Patent: Dec. 11, 2018

(54) VIRTUAL REALITY COMMUNICATION SYSTEMS AND METHODS THEREOF

(71) Applicant: Hashplay Inc., San Francisco, CA (US)

(72) Inventor: Ingo Nadler, Bad Breisig (DE)

(73) Assignee: HASHPLAY INC., San Francisco, CA (US)

( * ) Notice: Subject to any disclaimer, the term of this patent is extended or adjusted under 35 U.S.C. 154(b) by 331 days.

(21) Appl. No.: 15/159,158

(22) Filed: May 19, 2016

(65) Prior Publication Data

US 2017/0026635 A1  Jan. 26, 2017

Related U.S. Application Data (60) Provisional application No. 62/200,674, filed on Aug. 4, 2015, provisional application No. 62/163,403, filed on May 19, 2015.

(51) Int. Cl.

| | |
|---|---|
| *H04N 13/239* | (2018.01) |
| *H04N 13/167* | (2018.01) |
| *H04N 13/156* | (2018.01) |
| *G06F 1/16* | (2006.01) |
| *G06T 19/00* | (2011.01) |
| *G06F 3/01* | (2006.01) |
| *H04N 13/194* | (2018.01) |

(Continued)

(52) U.S. Cl.
CPC ........... *H04N 13/239* (2018.05); *G06F 1/163* (2013.01); *G06F 1/1686* (2013.01); *G06F 3/011* (2013.01); *G06F 3/014* (2013.01); *G06F 3/017* (2013.01); *G06F 3/0304* (2013.01); *G06T 19/006* (2013.01); *H04N 13/156* (2018.05); *H04N 13/167* (2018.05); *H04N 13/194* (2018.05); *H04N 13/296* (2018.05); *H04N 13/344* (2018.05); *H04N 13/398* (2018.05)

(58) Field of Classification Search
CPC ........ G06F 1/163; G06F 1/1686; G06F 3/011; G06F 3/014; G06F 3/017; G06F 3/0304; G06T 19/006; H04N 13/239; H04N 13/344; H04N 13/296; H04N 13/194; H04N 13/122; H04N 13/004; H04N 13/0051; H04N 13/0059; H04N 13/0239; H04N 13/0296; H04N 13/044
See application file for complete search history.

(56) References Cited

U.S. PATENT DOCUMENTS

| | | | | |
|---|---|---|---|---|
| 2006/0227151 | A1* | 10/2006 | Bannai | A63F 13/00 345/633 |
| 2013/0331161 | A1* | 12/2013 | Kira | H04N 13/156 463/9 |

* cited by examiner

*Primary Examiner* — Huy T Nguyen
(74) *Attorney, Agent, or Firm* — Ziegler IP Law Group, LLC (57) ABSTRACT

A virtual reality communication system includes a first computing device and a second computing device. The first computing device includes a first camera configured to capture at least one image, and a connector. The second computing device includes a second camera configured to capture the at least one image, a docking connector configured to receive the connector of the first computing device, an image processor configured to combine the at least one image of the first camera with the at least one image of the second camera by correcting color to generate a three dimensional image, and a synchronizing module configured to synchronize the at least one image captured by the first camera with the at least one image captured by the second camera and adjust an intraocular distance between the first camera and the second camera.

25 Claims, 9 Drawing Sheets

(51) Int. Cl.
*H04N 13/296* (2018.01)
*H04N 13/344* (2018.01)
*G06F 3/03* (2006.01)
*H04N 13/398* (2018.01)

```
┌─────────────────────────────────────────────────┐
│ CONNECT A FIRST COMPUTING DEVICE AND A SECOND   │
│ COMPUTING DEVICE BY RECEIVING A CONNECTOR OF THE│
│ FIRST COMPUTING DEVICE IN A DOCKING CONNECTOR OF│
│         THE SECOND COMPUTING DEVICE             │
│                      402                        │
└─────────────────────────────────────────────────┘
                        ↓
┌─────────────────────────────────────────────────┐
│ CAPTURE AT LEAST ONE IMAGE BY A FIRST CAMERA OF │
│             THE FIRST COMPUTING DEVICE          │
│                      404                        │
└─────────────────────────────────────────────────┘
                        ↓
┌─────────────────────────────────────────────────┐
│ CAPTURE AT LEAST ONE IMAGE BY A SECOND CAMERA OF│
│             THE SECOND COMPUTING DEVICE         │
│                      406                        │
└─────────────────────────────────────────────────┘
                        ↓
┌─────────────────────────────────────────────────┐
│ COMBINE THE AT LEAST ONE IMAGE OF THE FIRST     │
│ CAMERA WITH THE AT LEAST ONE IMAGE OF THE SECOND│
│ CAMERA BY CORRECTING COLOR TO GENERATE A THREE  │
│             DIMENSIONAL IMAGE                   │
│                      408                        │
└─────────────────────────────────────────────────┘
                        ↓
┌─────────────────────────────────────────────────┐
│ SYNCHRONIZE THE AT LEAST ONE IMAGE CAPTURED BY  │
│ THE FIRST CAMERA WITH THE AT LEAST ONE IMAGE    │
│ CAPTURED BY THE SECOND CAMERA SUCH THAT A RAPID │
│ MOTION APPEARS IN THE AT LEAST ONE IMAGE OF THE │
│ FIRST CAMERA AND THE AT LEAST ONE IMAGE OF THE  │
│      SECOND CAMERA AT THE SAME TIME             │
│                      410                        │
└─────────────────────────────────────────────────┘
                        ↓
┌─────────────────────────────────────────────────┐
│ ADJUST AN INTRAOCULAR DISTANCE BETWEEN THE FIRST│
│        CAMERA AND THE SECOND CAMERA             │
│                      412                        │
└─────────────────────────────────────────────────┘
```

VIRTUAL REALITY COMMUNICATION SYSTEMS AND METHODS THEREOF

TECHNICAL FIELD

The present disclosure relates generally to virtual reality; and more specifically, to a virtual reality communication system. Further, the present disclosure relates to a method of operating a virtual reality communication system. Furthermore, the present disclosure relates to a system for facilitating virtual interactions among at least two remotely located users. Moreover, the present disclosure relates to a method for facilitating collaboration and virtual interactions among at least two remotely located users. Further, the present disclosure relates to a system for facilitating collaboration and virtual interactions among at least two remotely located users.

BACKGROUND

In recent times, there has been a rapid advancement in the use of technology to enhance a user's experience of reality. For example, modern day technologies like virtual reality and augmented reality provide the user with a feeling of immersion in an environment. Both the virtual reality and the augmented reality may use stereoscopy for providing the user with deeper and more natural perception of the reality.

Presently, there exist many devices and methods to implement the virtual reality and the augmented reality. For example, a smart phone when inserted within a head mounted device can render the virtual reality experience to the user. Although a number of other devices such as headsets, glasses, gloves, and so forth are being used for the virtual reality and the augmented reality, these devices have certain limitations. For example, the head mount device used for experiencing the virtual reality cannot be used for implementation of the augmented reality. In addition to this, the existing methods for remote collaboration and training of users using the virtual reality lack immersive imagery and thereby, make difficult for the remote users to work simultaneously on a same project. Another limitation of the existing methods lies in the fact that a tablet based augmented reality collaboration does not leave the user's hands free to do work.

Therefore, in light of the foregoing discussion, there exists a need to overcome the aforementioned drawbacks associated with conventional devices and methods of the virtual and the augmented reality.

SUMMARY

The present disclosure seeks to provide a virtual reality communication system.

The present disclosure further seeks to provide a method of operating a virtual reality communication system.

Moreover, the present disclosure seeks to provide a system for facilitating virtual interactions among at least two remotely located users.

The present disclosure further seeks to provide a method for facilitating collaboration and virtual interactions among at least two remotely located users.

Moreover, the present disclosure seeks to provide a system for facilitating collaboration and virtual interactions among at least two remotely located users comprising a first user and a second user.

In a first aspect, an embodiment of the present disclosure provides a virtual reality communication system comprising:
a first computing device comprising a first camera configured to capture at least one image, and a connector;
a second computing device comprising:
  a second camera configured to capture the at least one image;
  a docking connector configured to receive the connector of the first computing device;
  an image processor configured to combine the at least one image of the first camera with the at least one image of the second camera by correcting color to generate a three dimensional image; and
  a synchronizing module configured to:
    synchronize the at least one image captured by the first camera with the at least one image captured by the second camera such that a rapid motion appears in the at least one image of the first camera and the at least one image of the second camera at the same time; and
    adjust an intraocular distance between the first camera and the second camera.

In a second aspect, an embodiment of the present disclosure provides a method of operating a virtual reality communication system, comprising:
connecting a first computing device and a second computing device by receiving a connector of the first computing device in a docking connector of the second computing device;
capturing at least one image by a first camera of the first computing device;
capturing the at least one image by a second camera of the second computing device;
combining the at least one image of the first camera with the at least one image of the second camera by correcting color to generate a three dimensional image;
synchronizing the at least one image captured by the first camera with the at least one image captured by the second camera such that a rapid motion appears in the at least one image of the first camera and the at least one image of the second camera at the same time; and
adjusting an intraocular distance between the first camera and the second camera.

In a third aspect, an embodiment of the present disclosure provides a system for facilitating virtual interactions among at least two remotely located users, the system comprising:
a first virtual or augmented reality communication system associated with a first user, comprising:
  a first computing device comprising a first camera configured to capture at least one image of hand movements of the first user, and a connector;
  a second computing device comprising:
    a second camera configured to capture the at least one image of the hand movements of the first user;
    a docking connector configured to receive the connector of the first computing device; and
    an image processor configured to combine the at least one image of the first camera with the at least one image of the second camera by correcting color to generate a first stereoscopic video;
    a transceiver configured to send the first stereoscopic video to a second virtual reality communication system associated with a second user via a communication network; and a synchronizing module configured to adjust an intraocular distance between the first camera and the second camera; and the second virtual reality communication system comprising:
- a third computing device comprising a third camera configured to capture at least one image of hand movements of the second user, and a connector;
- a fourth computing device comprising:
  - a fourth camera configured to capture the at least one image of the hand movements of the second user;
  - a docking connector configured to receive the connector of the third computing device; and
  - a transceiver configured to receive the first stereoscopic video;
  - an image processor configured to superimpose the received first stereoscopic video on a second display of the second virtual reality communication system.

In one embodiment, the image processor can be configured to combine the at least one image of the third camera with the at least one image of the fourth camera by correcting color to generate a second stereoscopic video and superimpose the second stereoscopic video, representing for example a real or rendered representation of the hand movement, on the second display of the second virtual reality communication system. This can allow the second user to see what they are doing as well as what is being transferred back to the first user. For example, the image processor can be configured to present the real or rendered representation of the hand movement as an overlay on the second display. This allows the second user to see what is being presented to the first user.

In a fourth aspect, an embodiment of the present disclosure provides a method for facilitating collaboration and virtual interactions among at least two remotely located users, the method comprising:

combining at least one image of a first camera of a first virtual or augmented reality communication system associated with a first user with at least one image of a second camera of the first virtual or augmented reality communication system to generate a first stereoscopic video;

sending the first stereoscopic video to a second virtual reality communication system associated with a second user via a communication network; and superimposing the received first stereoscopic video on a second display of the second virtual reality communication system.

In a fifth aspect, an embodiment of the present disclosure provides a system for facilitating collaboration and virtual interactions among at least two remotely located users comprising a first user and a second user, the method comprising:

a first virtual or augmented reality communication system associated with the first user configured to combine at least one image of a first camera of the first virtual or augmented reality communication system associated with the first user with at least one image of a second camera of the first virtual or augmented reality communication system to generate a first stereoscopic video, wherein the first virtual or augmented reality communication system includes a first display;

the first virtual or augmented reality communication system is configured to send the first stereoscopic video to a second virtual reality communication system associated with a second user via a communication network; and the second virtual reality communication system associated with the second user is configured to superimpose the received first stereoscopic video on a second display of the second virtual reality communication system.

Embodiments of the present disclosure substantially eliminate or at least partially address the aforementioned problems in the prior art, and enables virtual interactions among at least two remotely located users by use of virtual reality communication systems.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Glossary

Brief definitions of terms used throughout the present disclosure are given below.

The term "stereoscopy" refers to a technique which involves capturing images of a scene from two perspectives, and generates a resultant image from the captured images. The resultant image has an illusion of depth and thus, is a three dimensional image.

The term "virtual reality" is a technology based on a concept of creating a simulation of an environment by use of computing devices (for example, computers), communication networks, and so forth. Additionally, the virtual reality provides a user with a capability to interact and explore a virtual environment. Therefore, the virtual reality finds application in fields of entertainment, medicine, aviation training, sports, and so forth.

The term "augmented reality" is a technology that provides a user with a sense of immersion in an environment but by way of a different approach as compared to the virtual reality. The augmented reality enhances the user's real world viewing experience by superimposition of virtual elements in the virtual environment. The virtual elements that may be superimposed may include images, videos, textual data on a screen, and so forth. Therefore, the augmented reality finds applications in fields such as education, sports, navigation, gaming, space exploration and so forth.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based upon the present disclosure provided herein, one of ordinary skill in the art will appreciate a variety of ways in which connection or coupling exists in accordance with the aforementioned definition.

The terms "first", "second", and the like, herein do not denote any order, quantity, or importance, but rather are used to distinguish one element from another. Furthermore, the terms "a" and "an" herein do not denote a limitation of quantity, but rather denote the presence of at least one of the referenced item.

The phrases "in an embodiment", "in accordance with an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic; thus, the component or feature is to be regarded as being optional, in such case.

Embodiments of the Present Disclosure

In a first aspect, an embodiment of the present disclosure provides a virtual reality communication system comprising:

a first computing device comprising a first camera configured to capture at least one image, and a connector;

a second computing device comprising:
  a second camera configured to capture the at least one image;
  a docking connector configured to receive the connector of the first computing device;
  an image processor configured to combine the at least one image of the first camera with the at least one image of the second camera by correcting color to generate a three dimensional image; and
  a synchronizing module configured to:
    synchronize the at least one image captured by the first camera with the at least one image captured by the second camera such that a rapid motion appears in the at least one image of the first camera and the at least one image of the second camera at the same time; and
    adjust an intraocular distance between the first camera and the second camera.

In a second aspect, an embodiment of the present disclosure provides a method of operating a virtual reality communication system, comprising:

connecting a first computing device and a second computing device by receiving a connector of the first computing device in a docking connector of the second computing device;

capturing at least one image by a first camera of the first computing device;

capturing the at least one image by a second camera of the second computing device;

combining the at least one image of the first camera with the at least one image of the second camera by correcting color to generate a three dimensional image;

synchronizing the at least one image captured by the first camera with the at least one image captured by the second camera such that a rapid motion appears in the at least one image of the first camera and the at least one image of the second camera at the same time; and adjusting an intraocular distance between the first camera and the second camera.

In a third aspect, an embodiment of the present disclosure provides a system for facilitating virtual interactions among at least two remotely located users, the system comprising:

a first virtual or augmented reality communication system associated with a first user, comprising:
  a first computing device comprising a first camera configured to capture at least one image of hand movements of the first user, and a connector;
  a second computing device comprising:
    a second camera configured to capture the at least one image of the hand movements of the first user;
    a docking connector configured to receive the connector of the first computing device;
    an image processor configured to combine the at least one image of the first camera with the at least one image of the second camera by correcting color to generate a first stereoscopic video;
    a transceiver configured to send the first stereoscopic video to a second virtual reality communication system associated with a second user via a communication network; and
    a synchronizing module configured to adjust an intraocular distance between the first camera and the second camera; and
  the second virtual reality communication system comprising:
    a third computing device comprising a third camera configured to capture at least one image of hand movements of the second user, and a connector;

a fourth computing device comprising:
  a fourth camera configured to capture the at least one image of the hand movements of the second user;
  a docking connector configured to receive the connector of the third computing device;
  a transceiver configured to receive the first stereoscopic video; and
  an image processor configured to superimpose the received first stereoscopic video on a second display of the second virtual reality communication system.

In a fourth aspect, an embodiment of the present disclosure provides a method for facilitating collaboration and virtual interactions among at least two remotely located users, the method comprising:
  combining at least one image of a first camera of a first virtual or augmented reality communication system associated with a first user with at least one image of a second camera of the first virtual or augmented reality communication system to generate a first stereoscopic video;
  sending the first stereoscopic video to a second virtual reality communication system associated with a second user via a communication network; and
  superimposing the received first stereoscopic video on a second display of the second virtual reality communication system.

In a fifth aspect, an embodiment of the present disclosure provides a system for facilitating collaboration and virtual interactions among at least two remotely located users comprising a first user and a second user, the method comprising:
  a first virtual or augmented reality communication system associated with the first user configured to combine at least one image of a first camera of the first virtual or augmented reality communication system associated with the first user with at least one image of a second camera of the first virtual or augmented reality communication system to generate a first stereoscopic video, wherein the first virtual or augmented reality communication system includes a first display;
  the first virtual or augmented reality communication system is configured to send the first stereoscopic video to a second virtual reality communication system associated with a second user via a communication network; and
  the second virtual reality communication system associated with the second user is configured to superimpose the received first stereoscopic video on a second display of the second virtual reality communication system.

The virtual reality communication system provides an immersive visualization for a user to truly experience reality around him/her. The virtual reality communication system comprises a first computing device and a second computing device.

The first computing device comprises a first camera. The first camera is configured to capture at least one image. In an embodiment, the at least one image can be organized and stored in a memory of the first computing device in a suitable image file format. Examples of the image file format include, but are not limited to, Joint Photographic Experts Group (JPEG) or JPEG File Interchange Format (JFIF), Tagged Image File Format (TIFF), Portable Network Graphics (PNG), Graphics Interchange Format (GIF), and Bitmap file format (BMP).

The second computing device comprises a second camera configured to capture the at least one image. The at least one image can be organized and stored in any of the suitable image file format as described above. In an embodiment, the first camera and the second camera face a same direction and may be synchronized electronically by a software or hardware component.

Further, the first computing device comprises a connector and the second computing device comprises a docking connector configured to receive the connector of the first computing device. In this way, the first computing device and the second computing device get connected to each other.

In an embodiment, the first computing device is a portable device such as a smart phone, and a digital camera and is disposed external to the second computing device. Further, the camera of the portable device (i.e. the first camera) faces in direction similar to a direction of the camera of the second computing device (i.e. the second camera). As these two devices are communicatively coupled to each other via the connectors, the portable device and the second computing device can communicate and process the images in order to generate the virtual and augmented reality for the user.

In another embodiment, the first computing device is a case of the second computing device. Specifically, the first computing device is the case for receiving and/or accommodating the second computing device. In such instance, a first part of the case comprises a recess for receiving the second computing device. In an embodiment, dimensions of the recess are substantially similar to the dimensions of an exterior portion of the second computing device so that the recess accommodates and firmly holds the second computing device therein. Further, the second computing device gets coupled to the case using the connector and the docking connector. Further, the case includes a first part and a second part such that the first part of the case includes a first camera and the second part comprises a hole to accommodate the second camera of the second computing device. Further, the first part of the case may also include other electronics, such as a power source configured to provide additional battery power to the second computing device.

In yet another embodiment, the first computing device is a case of a head-mounted virtual reality device configured to connect to the second computing device. Specifically, the second computing device is configured to be received in a recess of the case of the head-mounted virtual reality device. In an embodiment, the case comprises a hole located at a side at a first distance from a center of the case. The hole is configured to reveal the camera of the second computing device (i.e. the second camera). Specifically, the hole is configured to receive the second camera when the second computing device is received in the recess of the case of the head-mounted virtual reality device. Further, the case comprises the first camera located at another side at a second distance from the center of the case. In an embodiment, the first distance is equal to the second distance. Further, the first distance and the second distance creates an intraocular distance between the first camera and the second camera. In an embodiment, the intraocular distance is a resultant distance between the first camera and the second camera.

In an embodiment, the second computing device comprises a smart phone.

The second computing device further comprises a synchronizing module. The synchronizing module is configured to synchronize the at least one image captured by the first camera with the at least one image captured by the second camera such that a rapid motion appears in the at least one image of the first camera and the at least one image of the second camera at the same time. Further, the synchronizing module is configured to adjust the intraocular distance between the first camera and the second camera.

The second computing device further comprises an image processor. The image processor is configured to shift the at least one image of the first camera and the at least one image of the second camera by an adjustable number of pixels to compensate a negative parallax introduced due to the intraocular distance between the second camera and the first camera.

Further, the image processor is configured to scale the at least one image of the first camera and the at least one image of the second camera horizontally to combine and fit the at least one image of the first camera and the at least one image of the second camera into the three dimensional image. Specifically, the image processor is configured to resize the at least one image of the first camera and the at least one image of the second camera horizontally such that these images when combined, can be easily fitted to generate the three dimensional image. Further, the scaling is done in such a way that a trade-off in terms of efficiency, smoothness and sharpness is maintained between the images.

The image processor is further configured to combine the at least one image of the first camera with the at least one image of the second camera by correcting color to generate the three dimensional image. Alternatively, the at least one image of the first camera and the at least one image of the second camera can be combined to generate a stereoscopic video.

The image processor is further configured to use the three dimensional image as a stereoscopic backdrop (i.e. as a background). Furthermore, the image processor is configured to superimpose the three dimensional image by one or more virtual reality elements. In an embodiment, the one or more virtual reality elements may be two or three dimensional holograms. Examples of the virtual reality elements include, but are not limited to, an image, a video and textual data.

In an embodiment, the second computing device further comprises a transceiver configured to send the three dimensional image to a server via a communication network. According to an embodiment, the server generally refers to an application, program, process or device that responds to requests for information or services by another application, program, process or device on the communication network. According to another embodiment, the server also encompasses software that makes the act of serving information or providing services possible.

According to an embodiment, the communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (Wi-MAX) networks.

In an embodiment, the virtual reality communication system can be used for facilitating virtual interactions among at least two remotely located users. For example, a user may be working on an object and may require assistance from another user sitting at a remote location. In such instance, a system facilitates virtual interactions among the two remotely located users. Alternatively, the virtual reality communication system may be used for facilitating the virtual interactions among more than two remotely located users.

The system for facilitating the virtual interactions among the at least two remotely located users comprises a first virtual or augmented reality communication system. The first virtual or augmented reality communication system is associated with a first user. Further, the first virtual or augmented reality communication system comprises a first computing device and a second computing device. In an embodiment, the first computing device and the second computing device associated with the first user are same as described above.

The first camera of the first computing device is configured to capture at least one image of hand movements of the first user.

The second camera of the second computing device is configured to capture the at least one image of the hand movements of the first user. Further, the docking connector of the second computing device is configured to receive the connector of the first computing device. In this way, the first computing device gets connected to the second computing device.

Further, the synchronizing module of the second computing device (of the first virtual or augmented reality communication system) is configured to synchronize the at least one image captured by the first camera with the at least one image captured by the second camera such that a rapid motion appears in the at least one image of the first camera and the at least one image of the second camera at the same time. Furthermore, the synchronizing module is configured to adjust the intraocular distance between the first camera and the second camera.

The image processor of the second computing device is configured to combine the at least one image of the first camera with the at least one image of the second camera by correcting color to generate a first stereoscopic video. In an embodiment, the first stereoscopic video comprises a left half representing a left perspective view and a right half representing a right perspective view. In an exemplary embodiment, the left perspective view may be captured with the first camera and the right perspective view may be captured with the second camera.

The transceiver of the second computing device is configured to send the first stereoscopic video to a second virtual reality communication system associated with a second user via the communication network. The second virtual reality communication system comprises a third computing device and a fourth computing device. In an embodiment, the third computing device and the fourth computing device associated with the second user are similar to the first computing device and the second computing device, respectively, as described above.

The third computing device comprises a third camera configured to capture at least one image of hand movements of the second user.

The fourth computing device comprises a fourth camera configured to capture the at least one image of the hand movements of the second user. Further, a docking connector of the fourth computing device is configured to receive a connector of the third computing device. Further, a transceiver of the fourth computing device is configured to receive the first stereoscopic video. Furthermore, an image processor of the fourth computing device is configured to superimpose the received first stereoscopic video on a second display of the second virtual reality communication system.

In an embodiment, a synchronizing module of the fourth computing device is configured to synchronize the at least one image captured by the third camera with the at least one image captured by the fourth camera such that a rapid motion appears in the at least one image of the third camera and the at least one image of the fourth camera at the same time; and adjust the intraocular distance between the third camera and the fourth camera.

In an embodiment, the second user stands in front of a color keyed background. For example, the second user stands in front of a green screen. In another embodiment, the second user wears colored long sleeves gloves. In yet another embodiment, the second user wears one or more optical markers on his/her fingers and arms.

For each of the above scenarios, the image processor of the second virtual reality communication device is configured to use a color key to recognize only the movements of the arms and hands of the second user and remove other image components from the captured at least one image of the third camera and the fourth camera. Further, the image processor is configured to track movements of the hands and arms of the second user from the captured at least one image of the third camera and the fourth camera to generate at least one virtual image for the third camera and the fourth camera. In an embodiment, the second user is being tracked by at least one sensor detecting a motion and position of his/her hands and arms. For example, the at least one sensor includes a depth sensor.

Moreover, the image processor is configured to combine the at least one virtual image of the third camera and the fourth camera to generate a second stereoscopic video. The transceiver of the second virtual reality communication system is further configured to send the second stereoscopic video to the first virtual or augmented reality communication system via the communication network.

The image processor of the first virtual or augmented reality communication system is further configured to superimpose the received second stereoscopic video on a first display of the first virtual or augmented reality communication system. This results in superimposing the movements of the hands and arms of the second user onto the view of the first user.

In one embodiment, the image processor can be configured to combine the at least one image of the third camera with the at least one image of the fourth camera by correcting color to generate a second stereoscopic video and superimpose the second stereoscopic video, representing for example a real or rendered representation of the hand movement, on the second display of the second virtual reality communication system. This can allow the second user to see what they are doing as well as what is being transferred back to the first user. For example, the image processor can be configured to present the real or rendered representation of the hand movement as an overlay on the second display. This allows the second user to see what is being presented to the first user.

According to another embodiment, the transceiver of the second virtual reality communication system is configured to send tracking information associated with the movements of the hands and arms of the second user to the first virtual or augmented reality communication system. In such instance, the image processor of the first virtual or augmented reality communication system is configured to generate the second stereoscopic video and then superimpose the generated second stereoscopic video on the first display of the first virtual or augmented reality communication system.

The present disclosure provides virtual reality communication systems and methods thereof, for implementing virtual reality and augmented reality. The methods and systems described in the present disclosure overcome the drawbacks associated with conventional techniques by describing a virtual reality communication system which may also be used to implement augmented reality. Additionally, the present disclosure discusses the use of smart phones for an experience of virtual reality in conjunction with any computing device that comprises a camera and a connector. The virtual reality communication system of the present disclosure may be used by remote users to work simultaneously on a same project. Advantageously, the system and methods described herein leave user's hands free to do any work.

DETAILED DESCRIPTION OF THE DRAWINGS

Figure 1A:
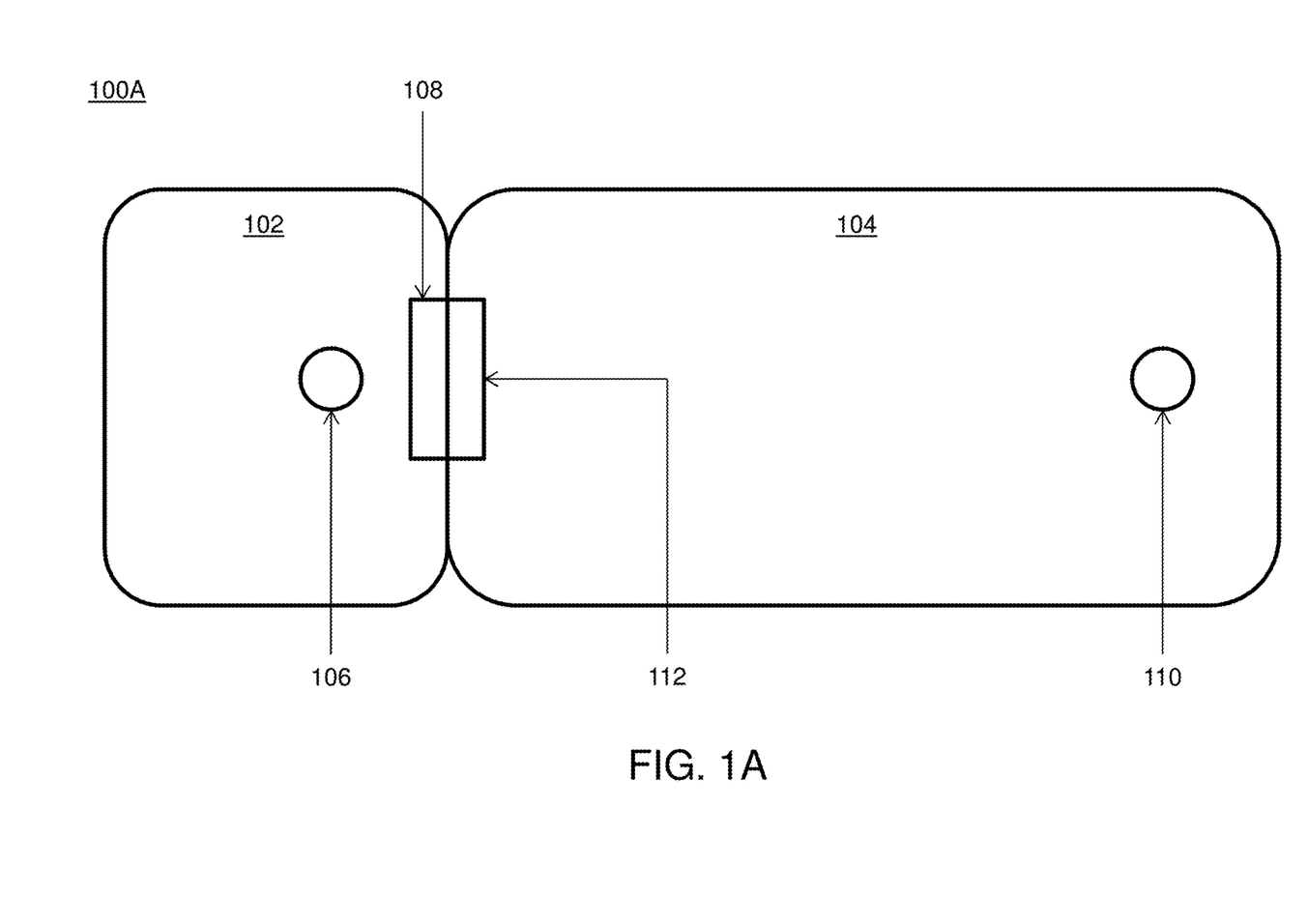
FIGS. 1A-1C are schematic illustrations of a virtual reality communication system, in accordance with different embodiments of the present disclosure.

Referring to FIG. 1A, illustrated is a schematic illustration of a virtual reality communication system 100A, in accordance with a first embodiment of the present disclosure. The virtual reality communication system 100A comprises a first computing device 102 and a second computing device 104. The first computing device 102 comprises a first camera 106 and a connector 108. The second computing device 104 comprises a second camera 110 and a docking connector 112. As shown, the docking connector 112 of the second computing device 104 is configured to receive the connector 108 of the first computing device 102.

Figure 1B:
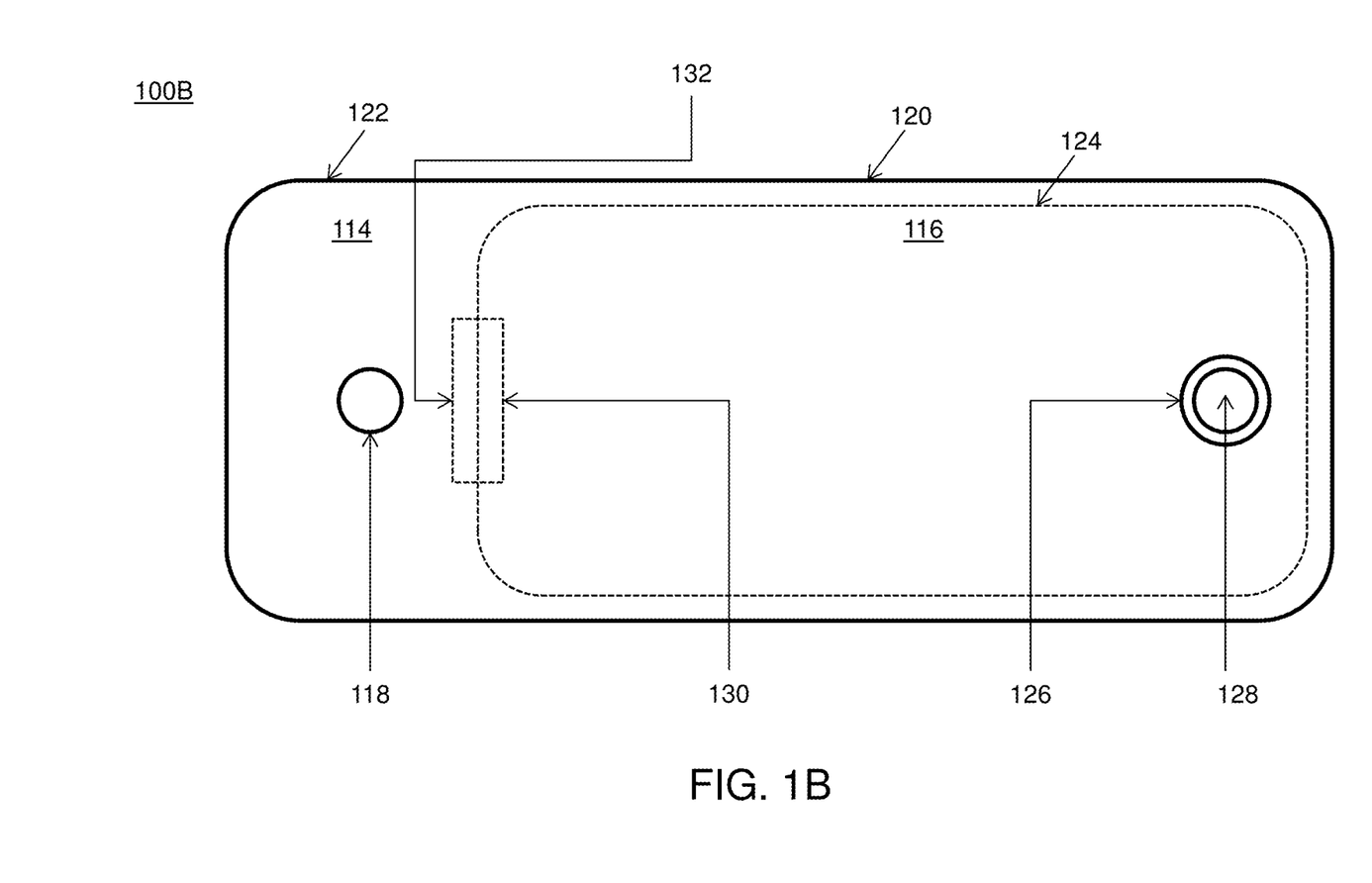

Referring to FIG. 1B, illustrated is a schematic illustration of a virtual reality communication system 100B, in accordance with a second embodiment of the present disclosure. The virtual reality communication system 100B comprises a first computing device 114 and a second computing device 116. As shown, the first computing device 114 is a case of the second computing device 116. The case includes a first camera 118. The case comprises a first part 120 and a second part 122. The first part 120 comprises a recess 124 for receiving the second computing device 116. Further, the first part 120 comprises a hole 126 to accommodate a second camera 128 of the second computing device 116. The second computing device 116 comprises a docking connector 130 for receiving a connector 132 of the first computing device 114.

Figure 1C:
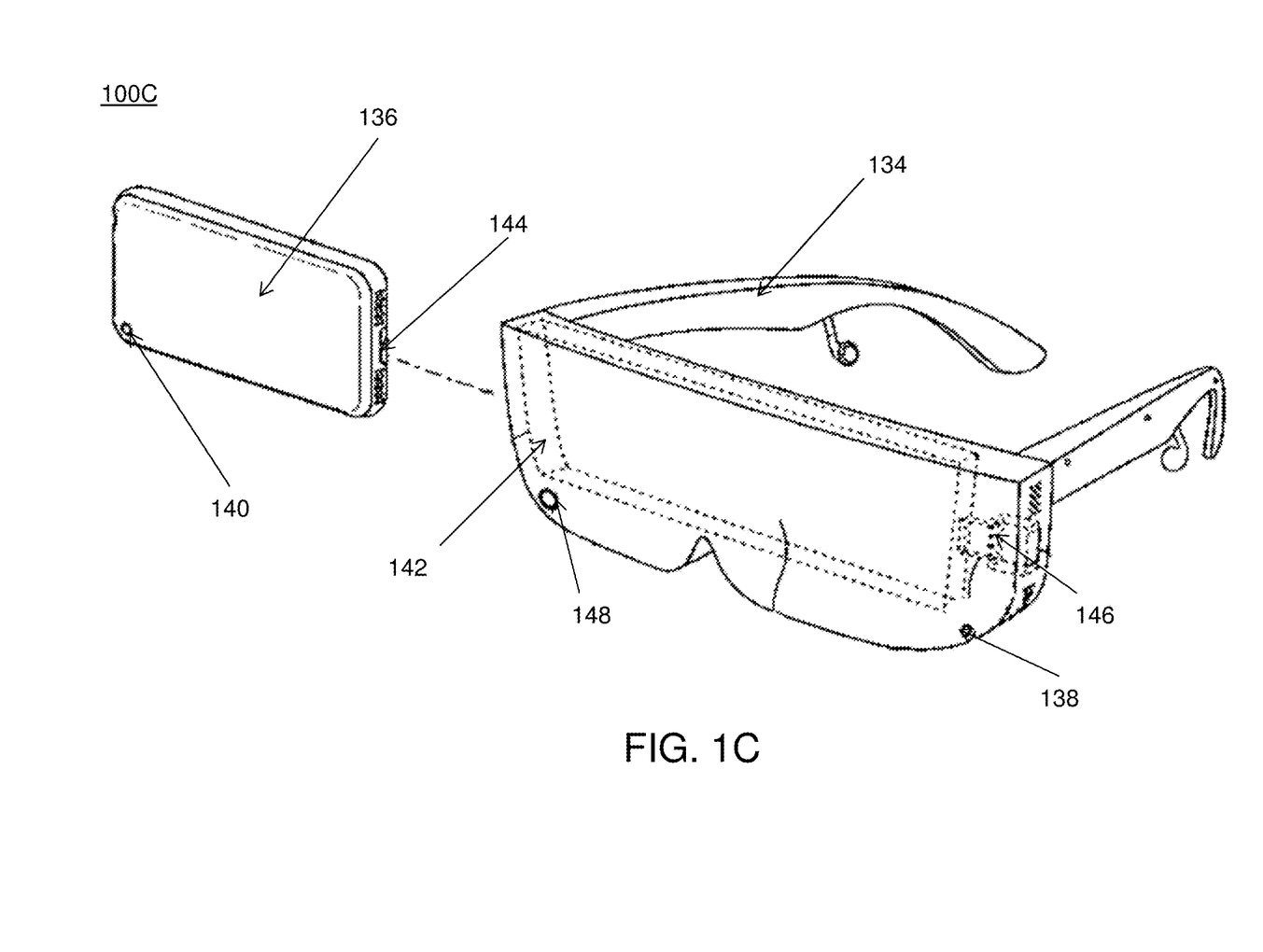

Referring to FIG. 1C, illustrated is a schematic illustration of a virtual reality communication system 100C, in accordance with a third embodiment of the present disclosure. The virtual reality communication system 100C comprises a first computing device 134 and a second computing device 136. The first computing device 134 comprises a first camera 138 and the second computing device 136 comprises a second camera 140.

The first computing device 134 is a case of a head-mounted virtual reality device configured to connect to the second computing device 136. As shown, the second computing device 136 is configured to be received in a recess 142 of the case of the head-mounted virtual reality device. Further, the second computing device 136 comprises a docking connector 144 which gets coupled to a connector 146 of the case of the head-mounted virtual reality device.

The case of the head-mounted virtual reality device comprises a hole 148 located at a side at a first distance from a center of the case. The hole 148 is configured to reveal the second camera 140 of the second computing device 136. Further, the first camera 138 is located at another side at a second distance from center of the case.

Figure 2:
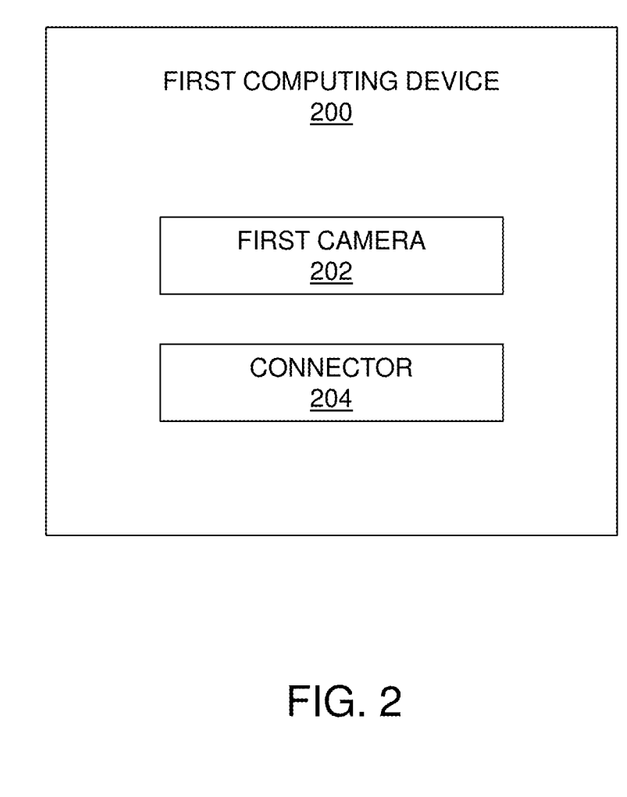
FIG. 2 is a schematic illustration of a block diagram of a first computing device, in accordance with an embodiment of the present disclosure.

Referring to FIG. 2, illustrated is a schematic illustration of a block diagram of a first computing device 200, in accordance with an embodiment of the present disclosure. The first computing device 200 comprises a first camera 202 and a connector 204.

FIG. 2 is merely an example, which should not unduly limit the scope of the claims herein. A person skilled in the art will recognize many variations, alternatives, and modifications of embodiments of the present disclosure.

Figure 3:
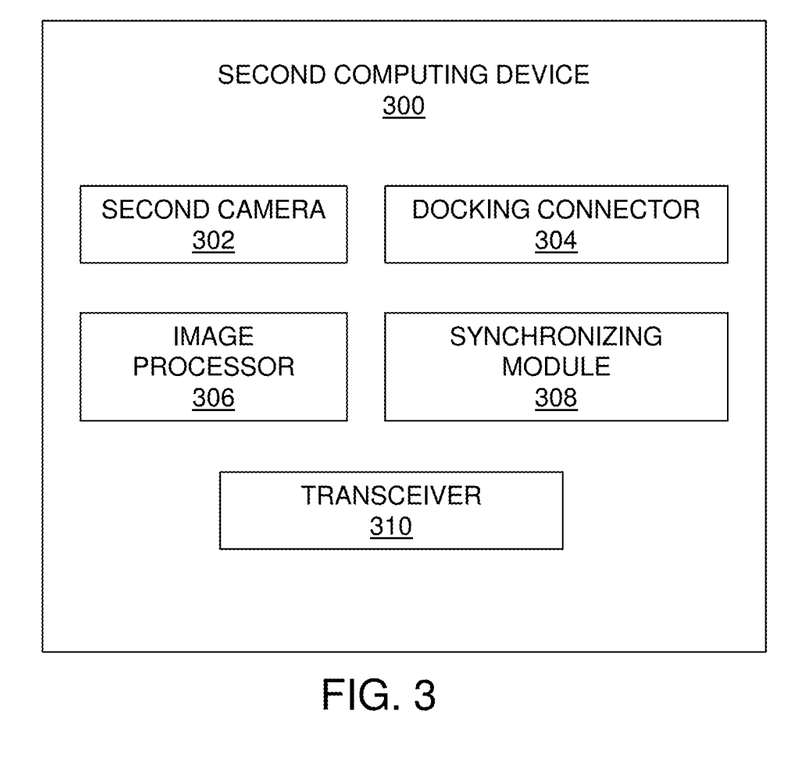
FIG. 3 is a schematic illustration of a block diagram of a second computing device, in accordance with an embodiment of the present disclosure.

Referring to FIG. 3, illustrated is a schematic illustration of a block diagram of a second computing device 300, in accordance with an embodiment of the present disclosure. The second computing device 300 comprises a second camera 302, a docking connector 304, an image processor 306, a synchronizing module 308, and a transceiver 310.

FIG. 3 is merely an example, which should not unduly limit the scope of the claims herein. A person skilled in the art will recognize many variations, alternatives, and modifications of embodiments of the present disclosure.

Figure 4:
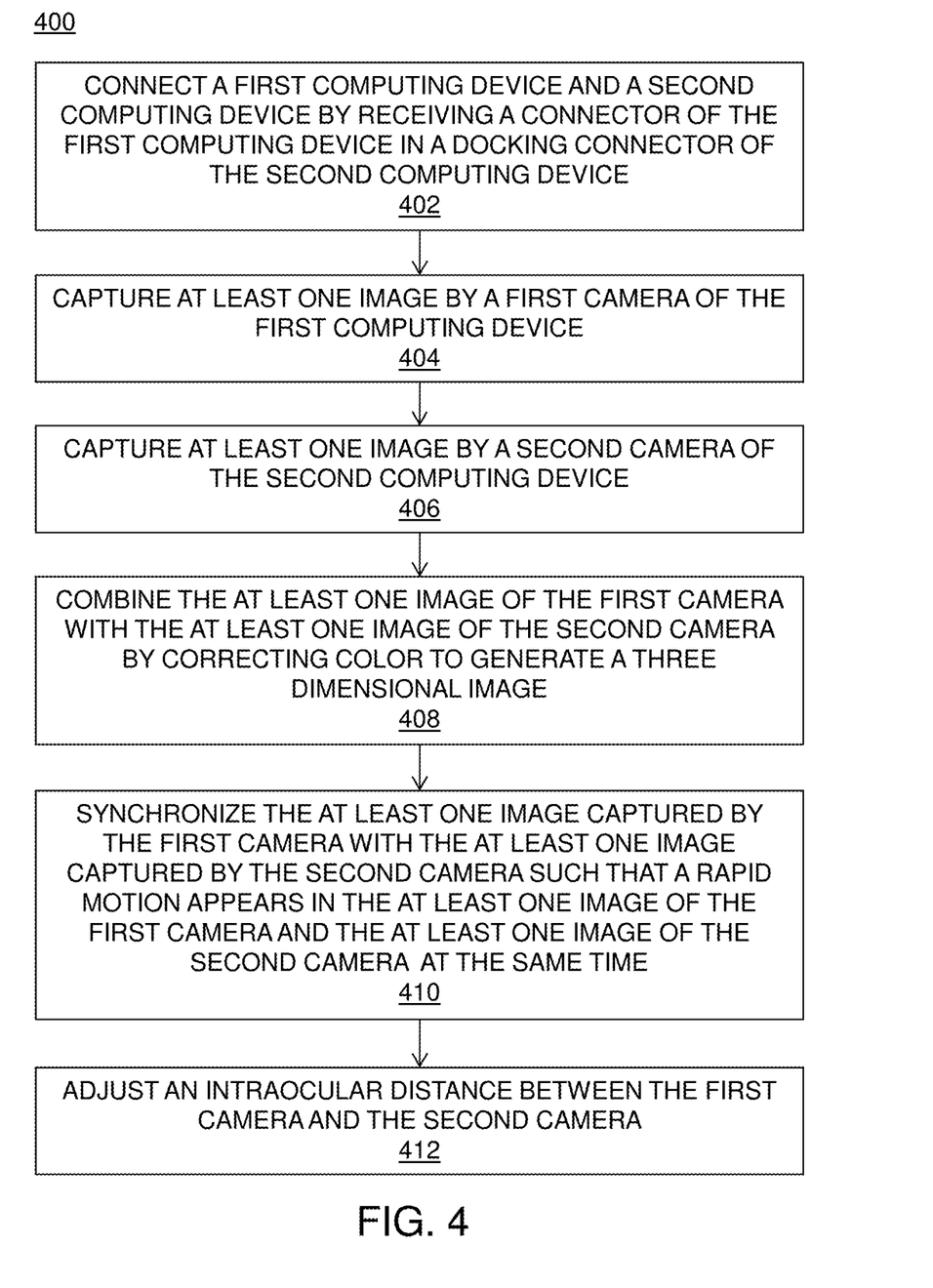
FIG. 4 is an illustration of steps of a method of operating the virtual reality communication system, in accordance with an embodiment of the present disclosure.

Referring to FIG. 4, illustrated are steps of a method 400 of operating a virtual reality communication system (such as the virtual reality communication systems 100A, 100B, and 100C as shown in FIGS. 1A-1C), in accordance with an embodiment of the present disclosure. At step 402, a first computing device and a second computing device are connected by receiving a connector of the first computing device in a docking connector of the second computing device. At step 404, at least one image is captured by a first camera of the first computing device. At step 406, at least one image is captured by a second camera of the second computing device. At step 408, the at least one image of the first camera is combined with the at least one image of the second camera by correcting color to generate a three dimensional image. At step 410, the at least one image captured by the first camera are synchronized with the at least one image captured by the second camera such that a rapid motion appears in the at least one image of the first camera and the at least one image of the second camera at the same time. At step 412, an intraocular distance between the first camera and the second camera, is adjusted.

The steps 402 to 412 are only illustrative and other alternatives can also be provided where one or more steps are added, one or more steps are removed, or one or more steps are provided in a different sequence without departing from the scope of the claims herein.

Figure 5:
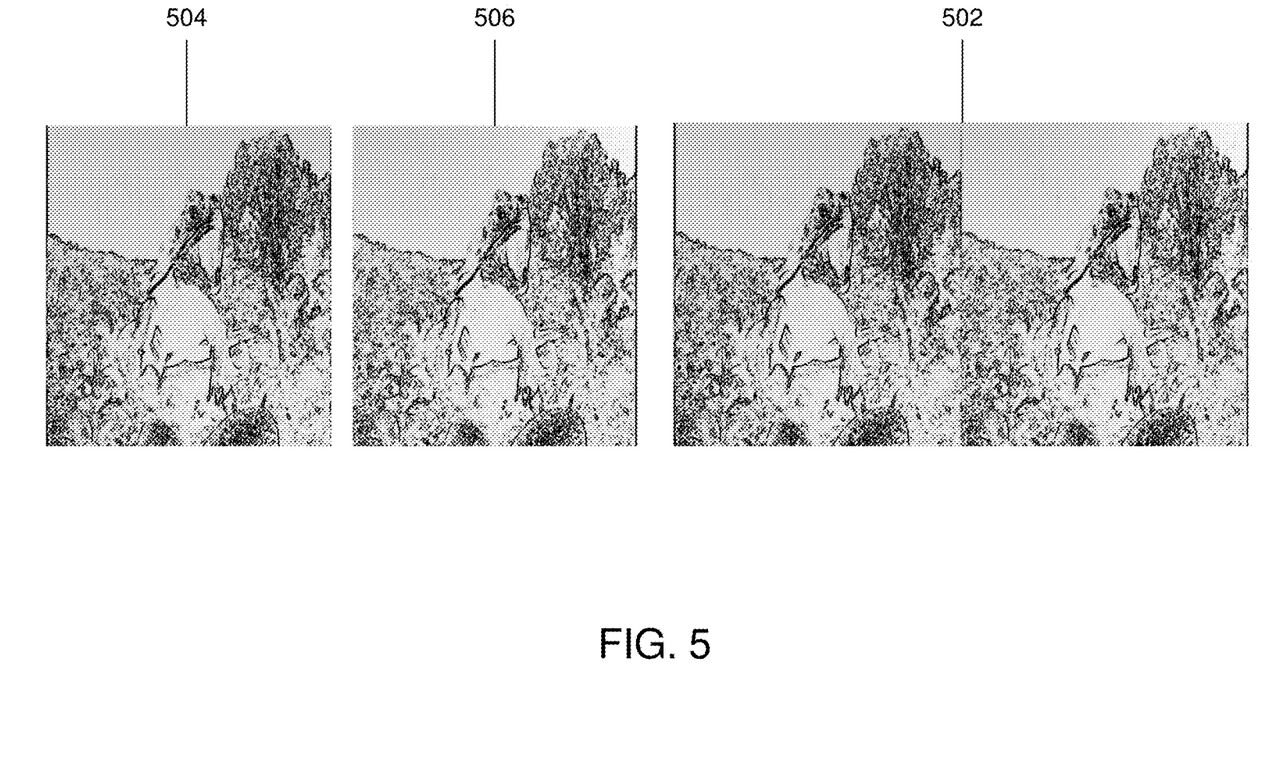
FIG. 5 is a schematic illustration of an exemplary embodiment of generation of a three dimensional image, in accordance with an embodiment of the present disclosure.

Referring to FIG. 5, illustrated is a schematic illustration of an exemplary embodiment of generation of a three dimensional image 502, in accordance with an embodiment of the present disclosure. The three dimensional image 502 is generated from a first image 504 and a second image 506. The first image 504 represents a left perspective view captured from a first camera (such as the first cameras 106, 118 and 138 shown in FIGS. 1A-1C). The second image 506 represents a right perspective view captured from a second camera (such as the first cameras 110, 128 and 140 shown in FIGS. 1A-1C). The first image 504 and the second image 506 are shifted, scaled, and combined to generate the three dimensional image 502.

Figure 6:
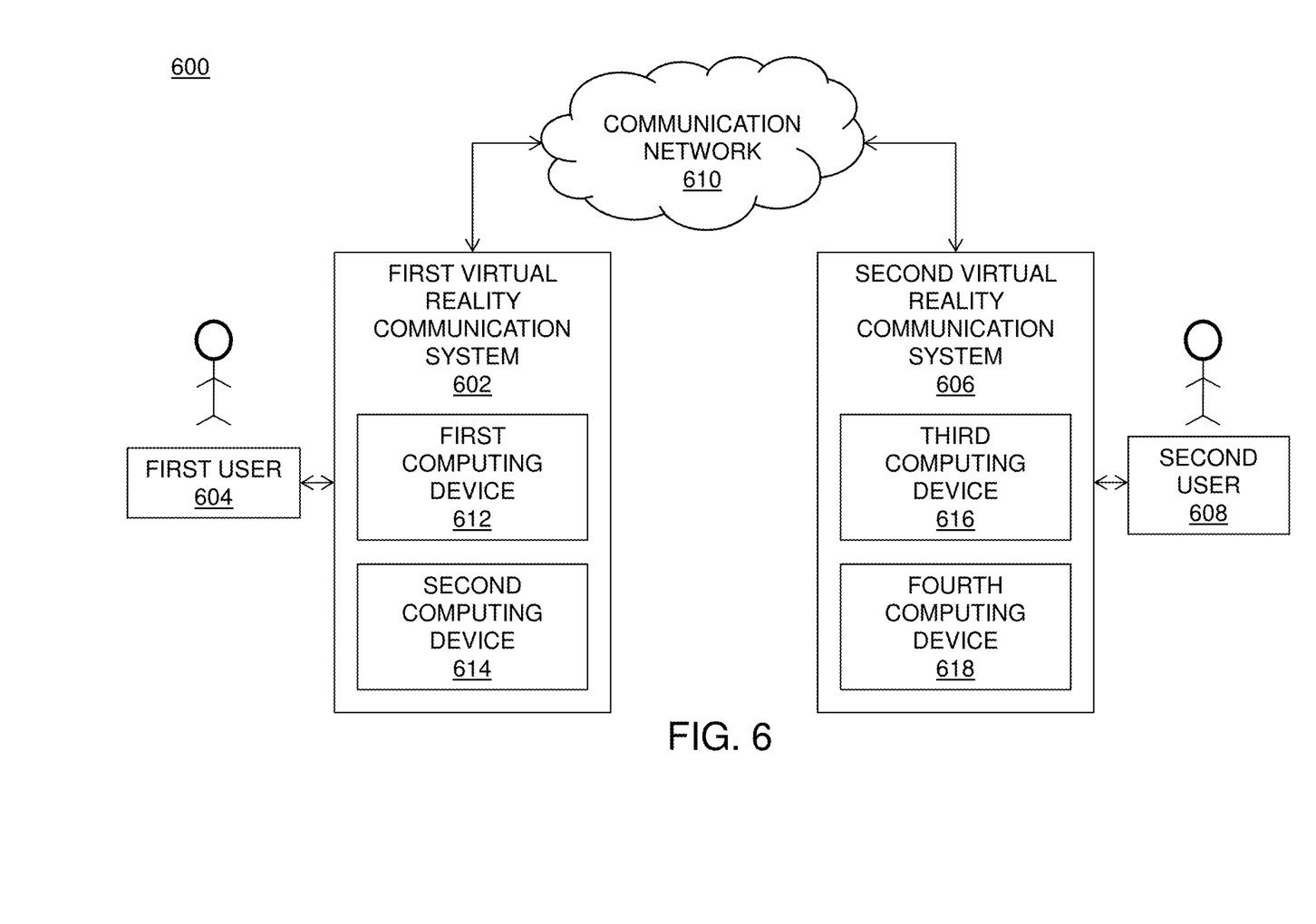
FIG. 6 is a schematic illustration of a system for facilitating virtual interactions among at least two remotely located users, in accordance with an embodiment of the present disclosure.

Referring to FIG. 6, illustrated is a schematic illustration of a system 600 for facilitating virtual interactions among at least two remotely located users, in accordance with an embodiment of the present disclosure. The system 600 comprises a first virtual or augmented reality communication system 602 associated with a first user 604, and a second virtual reality communication system 606 associated with a second user 608. The first virtual or augmented reality communication system 602 and the second virtual reality communication system 606 are communicably coupled to each other via a communication network 610. The first virtual or augmented reality communication system 602 comprises a first computing device 612 and a second computing device 614. The second virtual reality communication system 606 comprises a third computing device 616 and a fourth computing device 618.

FIG. 6 is merely an example, which should not unduly limit the scope of the claims herein. A person skilled in the art will recognize many variations, alternatives, and modifications of embodiments of the present disclosure.

Figure 7:
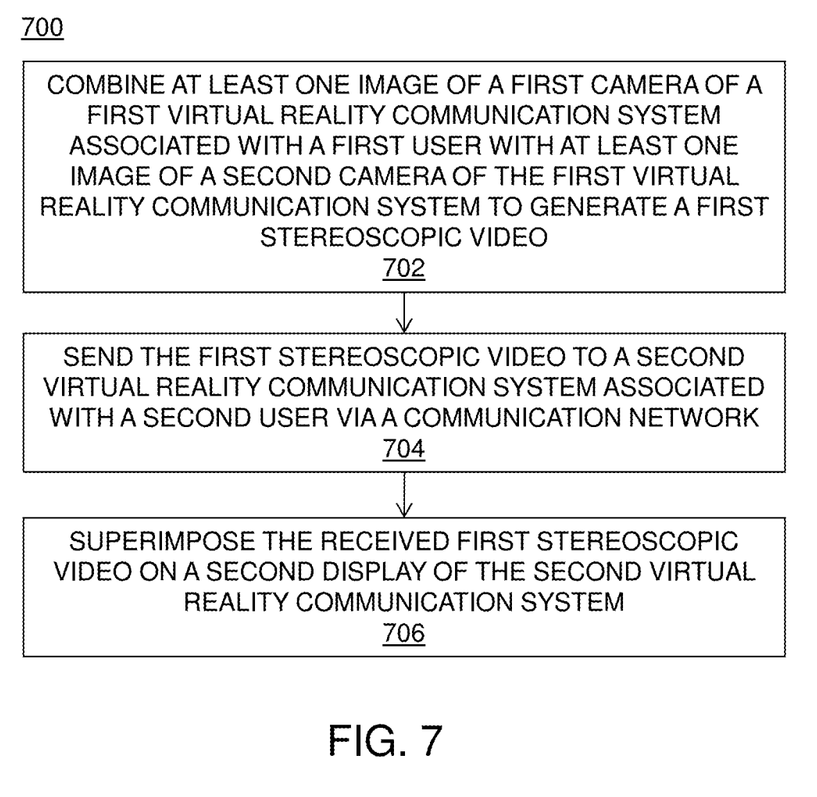
FIG. 7 is an illustration of steps of a method for facilitating collaboration and virtual interactions among the at least two remotely located users, in accordance with an embodiment of the present disclosure.

Referring to FIG. 7, illustrated are steps of a method 700 for facilitating collaboration and virtual interactions among at least two remotely located users, in accordance with an embodiment of the present disclosure. At step 702, at least one image of a first camera of a first virtual or augmented reality communication system associated with a first user is combined with at least one image of a second camera of the first virtual or augmented reality communication system to generate a first stereoscopic video. At step 704, the first stereoscopic video is sent to a second virtual reality communication system associated with a second user via a communication network. At step 706, the received first stereoscopic video is superimposed on a second display of the second virtual reality communication system.

The steps 702 to 706 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A virtual reality communication system comprising:
a first computing device comprising a first camera configured to capture at least one image, and a connector;
a second computing device comprising:
a second camera configured to capture the at least one image;
a docking connector configured to receive the connector of the first computing device;
an image processor configured to combine the at least one image of the first camera with the at least one image of the second camera by correcting color to generate a three dimensional image; and
a synchronizing module configured to:
synchronize the at least one image captured by the first camera with the at least one image captured by the second camera such that a rapid motion appears in the at least one image of the first camera and the at least one image of the second camera at the same time; and
adjust an intraocular distance between the first camera and the second camera.

2. The virtual reality communication system of claim 1, wherein the second computing device comprises a smart phone.

3. The virtual reality communication system of claim 2, wherein the first computing device is a single small device external to the second computing device and is configured to be attached to the second computing device.

4. The virtual reality communication system of claim 2, wherein the first computing device is a case of the second computing device, wherein the case includes the first camera and also provides additional battery power to the second computing device.

5. The virtual reality communication system of claim 2, wherein the first computing device is a case of a head-mounted virtual reality device configured to connect to the second computing device, wherein the case comprising:
 a hole located at a side at a first distance from a center of the case, the hole is configured to reveal the camera of the second computing device; and
 the first camera located at another side at a second distance from center of the case, wherein the first distance is equal to the second distance.

6. The virtual reality communication system of claim 2, wherein the image processor is further configured to:
 shift the at least one image of the first camera and the at least one image of the second camera by an adjustable number of pixels to compensate a negative parallax introduced due to the intraocular distance between the second camera and the first camera;
 scale the at least one image of the first camera and the at least one image of the second camera horizontally to combine and fit the at least one image of the first camera and the at least one image of the second camera into the three dimensional image;
 use the three dimensional image as a stereoscopic backdrop; and
 superimpose the three dimensional image by one or more virtual reality elements.

7. The system of claim 6, further comprising a transceiver configured to send the three dimensional image to a server via a communication network.

8. A method of operating a virtual reality communication system, comprising:
 connecting a first computing device and a second computing device by receiving a connector of the first computing device in a docking connector of the second computing device;
 capturing at least one image by a first camera of the first computing device;
 capturing the at least one image by a second camera of the second computing device;
 combining the at least one image of the first camera with the at least one image of the second camera by correcting color to generate a three dimensional image;
 synchronizing the at least one image captured by the first camera with the at least one image captured by the second camera such that a rapid motion appears in the at least one image of the first camera and the at least one image of the second camera at the same time; and
 adjusting an intraocular distance between the first camera and the second camera.

9. The method of claim 8 further comprising:
 shifting, by an image processor of the second computing device, the at least one image of the first camera and the at least one image of the second camera by an adjustable number of pixels to compensate a negative parallax introduced due to the intraocular distance between the second camera and the first camera;
 scaling, by the image processor, the at least one image of the first camera and the at least one image of the second camera horizontally to combine and fit the at least one image of the first camera and the at least one image of the second camera into the three dimensional image;
 using, by the image processor, the three dimensional image as a stereoscopic backdrop; and
 superimposing, by the image processor, the three dimensional image by one or more virtual reality elements.

10. The method of claim 9, further comprising sending the three dimensional image to a server via a communication network.

11. A system for facilitating virtual interactions among at least two remotely located users, the system comprising:
 a first virtual or augmented reality communication system associated with a first user, comprising:
  a first computing device comprising a first camera configured to capture at least one image of hand movements of the first user, and a connector;
  a second computing device comprising:
   a second camera configured to capture the at least one image of the hand movements of the first user;
   a docking connector configured to receive the connector of the first computing device; and
   an image processor configured to combine the at least one image of the first camera with the at least one image of the second camera by correcting color to generate a first stereoscopic video;
   a transceiver configured to send the first stereoscopic video to a second virtual reality communication system associated with a second user via a communication network; and
   a synchronizing module configured to adjust an intraocular distance between the first camera and the second camera; and
 the second virtual reality communication system comprising:
  a third computing device comprising a third camera configured to capture at least one image of hand movements of the second user, and a connector;
  a fourth computing device comprising:
   a fourth camera configured to capture the at least one image of the hand movements of the second user;
   a docking connector configured to receive the connector of the third computing device; and
   a transceiver configured to receive the first stereoscopic video;
   an image processor configured to superimpose the received first stereoscopic video on a second display of the second virtual reality communication system.

12. The system of claim 11, wherein the first and second stereoscopic video comprises a left half representing a left perspective view and a right half representing a right perspective view.

13. The system of claim 11, wherein the synchronizing module of the first virtual or augmented reality communication system is further configured to synchronize the at least one image captured by the first camera with the at least one image captured by the second camera such that a rapid motion appears in the at least one image of the first camera and the at least one image of the second camera at the same time.

14. The system of claim 11, wherein the second virtual reality communication system further comprises a synchronizing module configured to synchronize the at least one image captured by the third camera with the at least one image captured by the fourth camera such that a rapid motion appears in the at least one image of the third camera and the at least one image of the fourth camera at the same time; and adjust an intraocular distance between the third camera and the fourth camera.

15. The system of claim 11, wherein the second user stands in front of a color keyed background.

16. The system of claim 11, wherein the second user wears colored long sleeves gloves.

17. The system of claim 11, wherein the second user wears one or more optical markers on his/her fingers and arms.

18. The system of claim 11, wherein the second user is being tracked by at least one sensor detecting a motion and position of his/her hands and arms.

19. The system of any of the claim 11, wherein the image processor of the second virtual reality communication device is configured to:
   use color key to recognize only the movements of arms and hands of the second user and remove other image components from the captured at least one image of the third camera and the fourth camera;
   track movements of the hands and arms of the second user from the captured at least one image of the third camera and the fourth camera to generate at least one virtual image for the third camera and the fourth camera; and
   combine the at least one virtual image of the third camera and the fourth camera to generate a second stereoscopic video.

20. The system of claim 19, wherein the transceiver of the second virtual reality communication system is further configured to send the second stereoscopic video to the first virtual or augmented reality communication system.

21. The system of claim 20, wherein the image processor of the first virtual or augmented reality communication system is further configured to superimpose the received second stereoscopic video on a first display of the first virtual or augmented reality communication system.

22. A method for facilitating collaboration and virtual interactions among at least two remotely located users, the method comprising:
   combining at least one image of a first camera of a first virtual or augmented reality communication system associated with a first user with at least one image of a second camera of the first virtual or augmented reality communication system to generate a first stereoscopic video;
   sending the first stereoscopic video to a second virtual reality communication system associated with a second user via a communication network;
   using a synchronizing module to adjust an intraocular distance between the first camera and the second camera; and
   superimposing the received first stereoscopic video on a second display of the second virtual reality communication system.

23. A system for facilitating collaboration and virtual interactions among at least two remotely located users comprising a first user and a second user, the system comprising:
   a first virtual or augmented reality communication system associated with the first user configured to combine at least one image of a first camera of the first virtual or augmented reality communication system associated with the first user with at least one image of a second camera of the first virtual or augmented reality communication system to generate a first stereoscopic video, wherein the first virtual or augmented reality communication system includes a first display;
   wherein the first virtual or augmented reality communication system is configured to send the first stereoscopic video to a second virtual reality communication system associated with a second user via a communication network;
   the system for facilitating collaboration and virtual interactions further comprising a synchronizing module configured to adjust an intraocular distance between the first camera and the second camera; and
   wherein the second virtual reality communication system associated with the second user is configured to superimpose the received first stereoscopic video on a second display of the second virtual reality communication system.

24. A method for facilitating collaboration and virtual interactions among at least two remotely located users, the method comprising:
   combining at least one image of a first camera of a first virtual or augmented reality communication system associated with a first user with at least one image of a second camera of the first virtual or augmented reality communication system to generate a first stereoscopic video;
   sending the first stereoscopic video to a second virtual reality communication system associated with a second user via a communication network;
   using a synchronizing module to synchronize the at least one image of the first camera with the at least one image of the second camera such that a rapid motion appears in the at least one image of the first camera and the at least one image of the second camera at the same time; and
   superimposing the received first stereoscopic video on a second display of the second virtual reality communication system.

25. A system for facilitating collaboration and virtual interactions among at least two remotely located users comprising a first user and a second user, the system comprising:
   a first virtual or augmented reality communication system associated with the first user configured to combine at least one image of a first camera of the first virtual or augmented reality communication system associated with the first user with at least one image of a second camera of the first virtual or augmented reality communication system to generate a first stereoscopic video, wherein the first virtual or augmented reality communication system includes a first display;
   wherein the first virtual or augmented reality communication system is configured to send the first stereoscopic video to a second virtual reality communication system associated with a second user via a communication network;
   the system for facilitating collaboration and virtual interactions further comprising a synchronizing module configured to synchronize the at least one image of the first camera with the at least one image of the second camera such that a rapid motion appears in the at least one image of the first camera and the at least one image of the second camera at the same time; and
   wherein the second virtual reality communication system associated with the second user is configured to superimpose the received first stereoscopic video on a second display of the second virtual reality communication system.

* * * * *